US011409189B2

(12) United States Patent
Tomaru

(10) Patent No.: US 11,409,189 B2
(45) Date of Patent: Aug. 9, 2022

(54) OPTICAL MODULE, PROJECTION TYPE IMAGE DISPLAY APPARATUS, AND METHOD OF MANUFACTURING OPTICAL MODULE

(71) Applicant: SONY CORPORATION, Tokyo (JP)

(72) Inventor: Takahiro Tomaru, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,481

(22) PCT Filed: Jul. 5, 2019

(86) PCT No.: PCT/JP2019/026882
§ 371 (c)(1),
(2) Date: Jan. 26, 2021

(87) PCT Pub. No.: WO2020/026706
PCT Pub. Date: Feb. 6, 2020

(65) Prior Publication Data
US 2021/0216002 A1 Jul. 15, 2021

(30) Foreign Application Priority Data
Aug. 3, 2018 (JP) .............................. JP2018-146863

(51) Int. Cl.
G03B 21/14 (2006.01)
G03B 21/00 (2006.01)
(Continued)

(52) U.S. Cl.
CPC ......... *G03B 21/145* (2013.01); *G02B 5/3083* (2013.01); *G02B 27/104* (2013.01);
(Continued)

(58) Field of Classification Search
CPC .. G03B 21/14; G03B 21/2073; G03B 21/006; G06F 1/13363; G02B 27/28;
(Continued)

(56) References Cited

U.S. PATENT DOCUMENTS

2006/0274412 A1* 12/2006 Koyama .............. G03B 21/145
359/443
2008/0266470 A1* 10/2008 Muramoto ........... G02B 5/3083
349/8
(Continued)

FOREIGN PATENT DOCUMENTS

CN 101144940 A 3/2008
CN 101416085 A 4/2009
(Continued)

OTHER PUBLICATIONS

International Search Report and Written Opinion of PCT Application No. PCT/JP2019/026882, dated Sep. 3, 2019, 12 pages of ISRWO.
(Continued)

*Primary Examiner* — William C. Dowling
(74) *Attorney, Agent, or Firm* — Chip Law Group

(57) ABSTRACT

Provided are an optical module and an image display apparatus, in which an adjustment position of a compensation plate is easily maintained even in a case where the image display apparatus is miniaturized, and a method of manufacturing the image display apparatus. An optical module including a fixing part that fixes an adjustment position of a phase difference compensation plate in a Z-axis direction perpendicular to a main surface of a liquid crystal panel; a projection type image display apparatus including a light source, a rotation body that rotationally adjusts, by an angle adjustment member, rotation of a phase difference compensation plate disposed between a liquid crystal panel and a polarized beam splitter of the liquid crystal panel, and a
(Continued)

holder part that fixes the angle adjustment member of the rotation body to a fixing part in a Z-axis direction; and a method of manufacturing an optical module, the method including fixing an adjustment position of a phase difference compensation plate in a Z-axis direction perpendicular to a main surface of a liquid crystal panel.

11 Claims, 8 Drawing Sheets

(51) Int. Cl.
  *G02B 27/10* (2006.01)
  *G02B 27/14* (2006.01)
  *G02B 5/30* (2006.01)
  *G02F 1/13363* (2006.01)
  *G03B 21/20* (2006.01)
  *G02B 27/28* (2006.01)
(52) U.S. Cl.
  CPC ........... *G02B 27/141* (2013.01); *G02B 27/28* (2013.01); *G02F 1/13363* (2013.01); *G03B 21/006* (2013.01); *G03B 21/2073* (2013.01); *G02F 2413/08* (2013.01)
(58) Field of Classification Search
  CPC ............ G02B 2413/01; G02B 2413/07; G02B 2413/08; G02B 5/3083
  See application file for complete search history.

(56) References Cited

U.S. PATENT DOCUMENTS

| | | | |
|---|---|---|---|
| 2010/0026918 | A1 | 2/2010 | Nakagawa et al. |
| 2010/0091201 | A1* | 4/2010 | Koyama ................. G03B 21/16 349/5 |
| 2012/0188517 | A1 | 7/2012 | Kobayashi |
| 2015/0277112 | A1* | 10/2015 | Koyama ............... H04N 5/7441 349/9 |
| 2017/0017141 | A1* | 1/2017 | Natsume .............. G03B 21/145 |

FOREIGN PATENT DOCUMENTS

| | | |
|---|---|---|
| CN | 102147544 A | 8/2011 |
| CN | 104950486 A1 | 9/2015 |
| JP | 2007-011280 A | 1/2007 |
| JP | 2008-070666 A | 3/2008 |
| JP | 2012-189776 A | 10/2012 |
| JP | 2014-026128 A | 2/2014 |
| JP | 2014-206571 A | 10/2014 |
| JP | 2015-194659 A | 11/2015 |

OTHER PUBLICATIONS

Office Action for CN Patent Application No. 201980050015.X, dated Dec. 1, 2021, 06 pages of English Translation and 10 pages of Office Action.

* cited by examiner ial Patent Application No. PCT/JP2019/026882 filed on Jul. 5, 2019, which claims priority benefit of Japanese Patent Application No. JP 2018-146863 filed in the Japan Patent Office on Aug. 3, 2018. Each of the above-referenced applications is hereby incorporated herein by reference in its entirety.

OPTICAL MODULE, PROJECTION TYPE IMAGE DISPLAY APPARATUS, AND METHOD OF MANUFACTURING OPTICAL MODULE

CROSS REFERENCE TO RELATED APPLICATIONS

This application is a U.S. National Phase of International Patent Application No. PCT/JP2019/026882 filed on Jul. 5, 2019, which claims priority benefit of Japanese Patent Application No. JP 2018-146863 filed in the Japan Patent Office on Aug. 3, 2018. Each of the above-referenced applications is hereby incorporated herein by reference in its entirety.

TECHNICAL FIELD

The present technology relates to an optical module, a projection type image display apparatus, and a method of manufacturing an optical module.

BACKGROUND ART

Conventionally, a projector apparatus that projects an image on a screen, a wall, or the like is known as a projection type image display apparatus. A so-called liquid crystal (LCD) projector apparatus is widely used in which output light from a light source is optically modulated by a liquid crystal display device and projected on a screen.

As a type of the projector, for example, a type using a light source such as a laser, a lamp, an LED, or the like and projecting an image displayed by a liquid crystal panel or a digital micromirror device (DMD) is known.

The liquid crystal display device portion of the liquid crystal projector apparatus displays an image in a display mode corresponding to a type of liquid crystal molecules used in the liquid crystal panel. As the liquid crystal projector apparatus, a projection type image display apparatus such as a single plate type or a three plate type liquid crystal projector apparatus is known. In the projection type image display apparatus, a prism type polarized beam splitter (PBS) is generally used for polarization separation.

In recent years, development of a small projector apparatus that can be easily carried and can display an image has been advanced. There have been proposed small projectors that can be connected to a notebook PC or the like, video cameras with built-in optical modules that can project recorded images, and the like, and development of optical modules that can be built into mobile phones and smartphones has been advanced.

In the liquid crystal projector apparatus, a phase difference compensation plate is disposed between the light source and the liquid crystal panel, and the phase difference compensation plate is rotated to align polarization directions, thereby lowering illuminance at the time of an all-black screen.

Patent Documents 1 and 2 propose a phase difference compensation plate capable of easily adjusting a contrast. For example, there is proposed a phase difference compensation plate that has birefringence, compensates residual phase difference of a liquid crystal panel, and has special properties (see Patent Documents 1 and 2).

In addition, Patent Document 3 proposes a small optical module for a scanning image display apparatus capable of reducing relative position displacement of a spot on a display region such as a screen. In an optical component holder of the optical module, a first sloped surface and a second sloped surface are formed symmetrical to a first surface including an optical axis, and in a case, a first sloped surface and a second sloped surface of the case are formed symmetrical to the first surface so as to form a pair with the first sloped surface and the second sloped surface of the optical component holder.

CITATION LIST

Patent Document

Patent Document 1: JP 2007-11280 A
Patent Document 2: JP 2008-70666 A
Patent Document 3: JP 2014-26128 A

SUMMARY OF THE INVENTION

Problems to be Solved by the Invention

In Patent Documents 1 and 2, while an excellent compensation plate has been proposed, it is necessary to further investigate a configuration that can easily maintain an adjustment position of the compensation plate even in a case where an image display apparatus is miniaturized.

In Patent Document 3, since the shape of a mechanical component is specialized and complicated, it is necessary to further investigate a configuration that can easily maintain an adjustment position of a compensation plate even in a case where an image display apparatus is miniaturized.

Accordingly, it is a main object of the present technology to provide an optical module and an image display apparatus, in which an adjustment position of a compensation plate is easily maintained even in a case where the image display apparatus is miniaturized, and a method of manufacturing the optical module.

Solutions to Problems

The present technology can provide an optical module including a fixing part that fixes an adjustment position of a phase difference compensation plate in a Z-axis direction perpendicular to a main surface of a liquid crystal panel.

The present technology can provide a projection type image display apparatus including: a light source; a rotation body that rotationally adjusts, by an angle adjustment member, a phase difference compensation plate disposed between a liquid crystal panel and a polarized beam splitter of the liquid crystal panel; and a holder part that fixes the angle adjustment member of the rotation body to a fixing part in a Z-axis direction perpendicular to a main surface of the liquid crystal panel.

The present technology can provide a method of manufacturing an optical module, the method including fixing an adjustment position of a phase difference compensation plate in a Z-axis direction.

The fixing part may be provided to the holder part

The fixing part may have a region for applying a fixing agent.

The region for applying a fixing agent may include a recessed space.

The angle adjustment member that rotationally adjusts the phase difference compensation plate may be further included, and the angle adjustment member may be fixed to the fixing part in the Z-axis direction.

The angle adjustment member may be fixed by a fixing agent applied to the fixing part.

The fixing agent may include an adhesive.

A support plate may be further included on a side facing the fixing part.

The holder part may hold the rotation body that rotates the phase difference compensation plate.

The rotation body that rotates the phase difference compensation plate may be accommodated between the holder part provided with the fixing part and the support plate provided on the side facing the fixing part.

The phase difference compensation plate may be disposed between the liquid crystal panel and the polarized beam splitter of the liquid crystal panel.

Effects of the Invention

According to the present technology, it is possible to provide an optical module and an image display apparatus, in which an adjustment position of a compensation plate is easily maintained even in a case where the image display apparatus is miniaturized, and a method of manufacturing the optical module. Note that effects described herein are not necessarily limitative, and any of the effects described in the present disclosure may be obtained.

MODE FOR CARRYING OUT THE INVENTION

Figure 1:
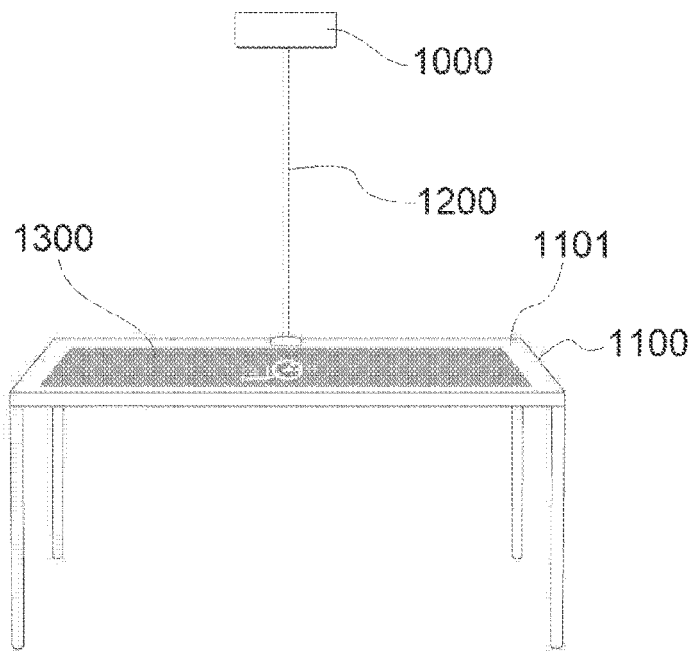
FIG. 1 is a view illustrating a strategic configuration of a projection type image display system according to an embodiment of the present technology.

Hereinafter, a preferred mode for carrying out the present technology will be described with reference to the drawings.

An embodiment described below indicates an example of a representative embodiment of the present technology, and the scope of the present technology is not narrowly interpreted by the embodiment. Note that the description will be made in the following order. In the drawings, the same or equivalent elements or members are denoted by the same reference numerals, and duplicate descriptions are omitted as appropriate.

1. Projection Type Image Display Apparatus 1000
2. Optical Module 1
2-1. Rotation Body
2-2. Fixing Part
2-3. Fixing Agent
2-4. Holder Part
2-5. Support Plate
3. Method of Manufacturing Optical Module and Image Display Apparatus of Present Technology
4. Image Display System or Image Display Apparatus of Present Technology 1. Projection Type Image Display Apparatus 1000

Figure 2:
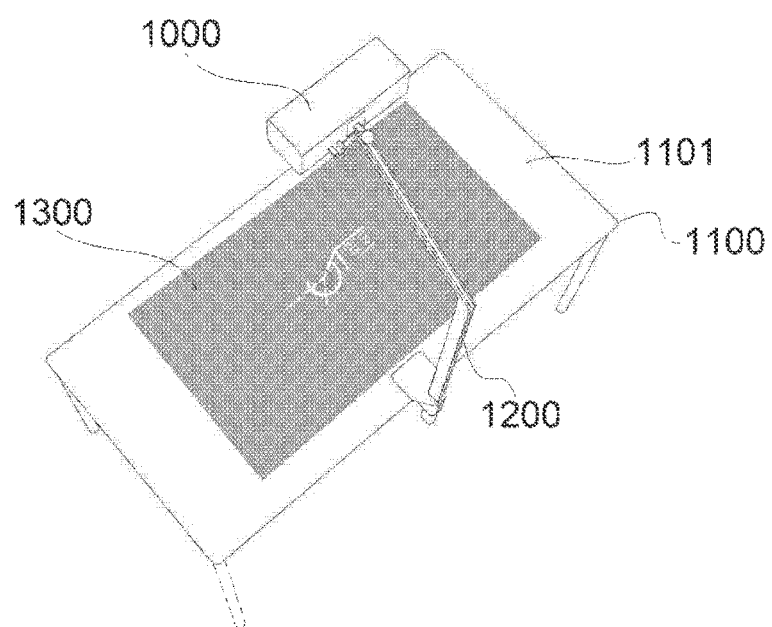
FIG. 2 is a view illustrating the strategic configuration of the projection type image display system according to the embodiment of the present technology.
Figure 3:
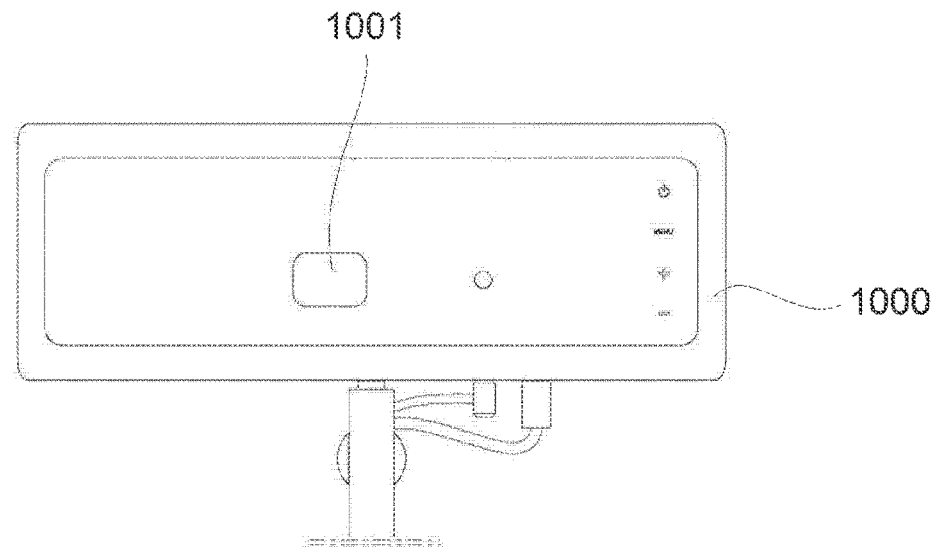
FIG. 3 is a view illustrating the strategic configuration of the projection type image display system according to the embodiment of the present technology.

A method of using a projection type display apparatus according to the present technology will be described below with reference to FIGS. 1 to 3. FIGS. 1 and 2 are views illustrating an example of a use state of the projection type display apparatus according to the present technology. FIG. 3 is a view illustrating a surface on which a projection port for image display light is disposed in the projection type display apparatus according to the present technology.

A projection type image display apparatus 1000 according to the present technology includes an optical module according to the present embodiment. A phase difference compensation plate included in the optical module is used to compensate a phase difference of a liquid crystal panel.

The projection type image display apparatus 1000 according to the present technology is an apparatus including a light source, a rotation body that rotationally adjusts, by an angle adjustment member, the phase difference compensation plate disposed between the liquid crystal panel and a polarized beam splitter of the liquid crystal panel, and a holder part that fixes the angle adjustment member of the rotation body to a fixing part in a Z-axis direction perpendicular to a main surface of the liquid crystal panel. Examples of the projection type image display apparatus of the present technology include a portable projector, a small projector, a mobile projector, a video projector, a video camera with a projector, and a smartphone.

As illustrated in FIGS. 1 and 2, the projection type display apparatus 1000 according to the present technology is connected to a boom 1200, and the boom 1200 is fixed to a table 1100. As illustrated in FIG. 3, image display light projected from the projection type display apparatus 1000 is projected from a projection port 1001 toward a top plate surface 1101. The projection type display apparatus 1000 is disposed to project image display light toward the top plate surface 1101 of the table 1100, for example. By the projection of the image display light, an image 1300 is projected on the top plate surface 1101. By the projection of the image 1300 on the top plate surface 1101 in this manner, a plurality of persons surrounding the table 1100 can view the image.

Figure 4:
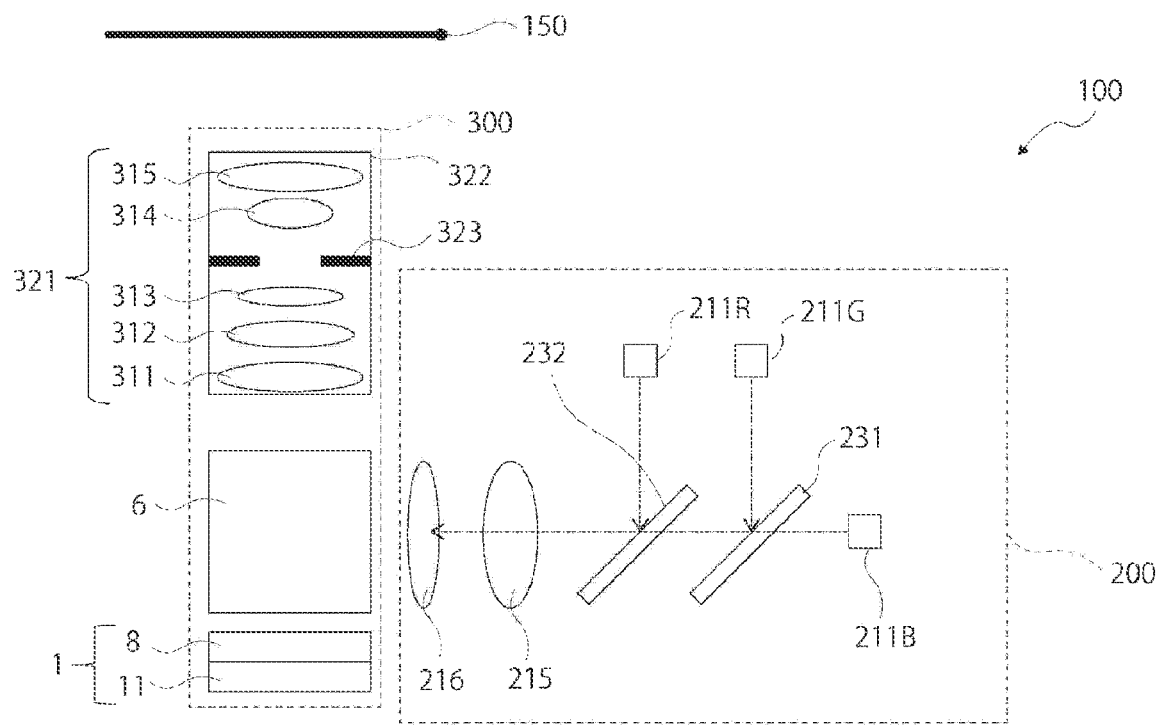
FIG. 4 is a schematic conceptual diagram of an example of a projection type image display apparatus in the present embodiment.

With reference to FIG. 4, a single plate type liquid crystal projector apparatus including an illumination optical system 200 and a projection optical system 300 will be described below as an example of a conceptual configuration system of the projection type image display apparatus 1000 of the present technology, but the present technology is not limited the example. The illumination optical system and the projection optical system may be an illumination optical device and a projection optical device, respectively. The projection type image display apparatus 1000 may include the optical module of the present technology, the light source, a dichroic mirror, a total reflection mirror, the polarized beam splitter, a combining prism, and a projection lens.

<Illumination Optical System 200>

The illumination optical system 200 has one or more red lasers, one or more green lasers, and one or more blue lasers inside. These may be collectively referred to as laser light sources. Furthermore, the illumination optical system 200 may include a dichroic mirror, and may include, for example, dichroic mirrors 232 and 231.

Alternate long and short dash lines illustrated in FIG. 4 each indicate an example of a ray path of a corresponding color beam. These laser light sources 211R, 211G, and 211B, the dichroic mirrors 231 and 232, an integrator lens 215, and a condenser lens 216 are collectively referred to as an optical element group.

The laser light sources (211R, 211G, and 211B) emit a red laser, a green laser, and a blue laser, respectively. The illumination optical system 200 may include three types of laser light sources that emit a red laser light beam, a green laser light beam, and a blue laser light beam. Note that the present technology is not limited to the laser light sources, and may be, for example, a photodiode (LED), a halogen lamp, a metal halide lamp, or a xenon lamp.

The dichroic mirror 231 is a mirror that selectively transmits the blue laser light beam while reflecting the green laser light beam. In addition, the dichroic mirror 232 is a mirror that selectively transmits the blue laser light beam and the green laser light beam emitted from the dichroic mirror 231 while selectively reflecting the red laser light beam. Thus, in the illumination optical system 200, color combining (optical path combining) is performed for the red laser light beam, the green laser light beam, and the blue laser light beam.

The integrator lens 215 uniformizes emitted light beams (uniformizes a light quantity distribution in a plane). Then, the condenser lens 216 condenses the emitted light beams from the integrator lens 215 and emits the condensed light beams to the outside as illumination light.

<Projection Optical System 300>

The projection optical system 300 includes, for example, a lens group 321 including one or more lenses (for example, lenses 311 to 315) and a diaphragm 323 that are housed in a lens barrel 322, a polarized beam splitter 6, and an optical module 1 according to the present technology.

The optical module 1, which will be described in detail later, includes, for example, a light valve 11 and a fixing part that fixes an adjustment position of the phase difference compensation plate in a direction perpendicular to a main surface of the light valve 11. The light valve 11 is a reflective liquid crystal element such as Liquid Crystal On Silicon (LCOS), for example. The light valve 11 is configured to modulate illumination light (for example, an S-polarized component) from the illumination optical system 200 on the basis of an image signal.

The polarized beam splitter 6 is a polarization separation element that emits different polarization components (for example, a P-polarized component and an S-changing component) in different directions.

The phase difference compensation plate may be disposed between the polarized beam splitter 6 and a liquid crystal panel 11, and the phase difference compensation plate may be accommodated in a phase difference compensator. The phase difference compensation plate may have a function of compensating phase difference of the polarized beam split-ter, or may have a function of compensating phase difference of the liquid crystal panel. In addition, a quarter wave plate may be used as the phase difference compensation plate, thereby image quality can be improved. A wire grid polarization element may be disposed as the polarized beam splitter. Also in the case of the wire grid polarization element, a quarter wave plate may be used as the phase difference compensation plate, thereby image quality can be improved.

The lens group 321 is configured to project (magnify and project) illumination light (image light) modulated by the optical module 1 of the present technology on a screen 150. Note that the number of lenses constituting the lens group 321 of the present technology is not particularly limited.

A single plate type liquid crystal projector apparatus 100 including the illumination optical system 200 and the projection optical system 300 of the present technology projects an image corresponding to light modulated by the optical module on the screen 150, so that desired image display is performed. Note that the screen is a surface for projecting an image projected from a projector or the like, and includes, but is not particularly limited to, a desktop, a wall, or a curtain.

2. Optical Module 1

Figure 5:
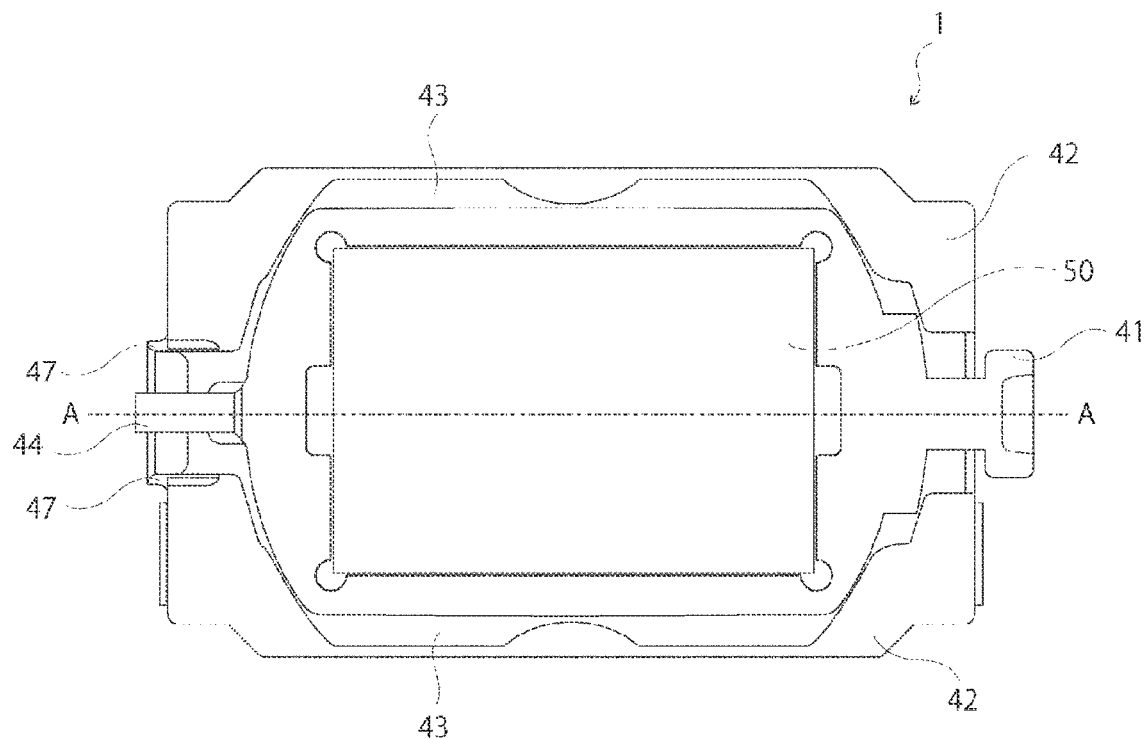
FIG. 5 is a plan view illustrating an example of a configuration of an optical module according to the present embodiment.
Figure 6:
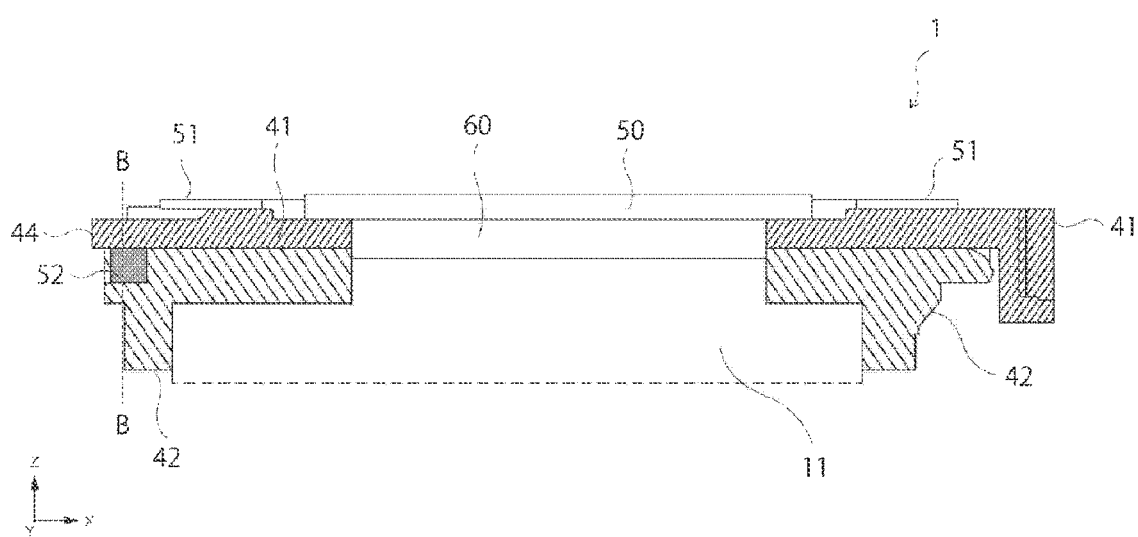
FIG. 6 is a cross-sectional view taken along a line A-A of the optical module according to the present embodiment.

The optical module 1 according to the present technology will be described with reference to FIGS. 5 to 10. FIG. 5 is a plan view illustrating an example of a configuration of the optical module 1 according to the embodiment of the present technology as viewed from a direction in which the phase difference compensation plate is installed. FIG. 6 is a cross-sectional view (line A-A) illustrating the example of the configuration of the optical module 1 according to the embodiment of the present technology.

Note that a direction perpendicular to the main surface of the liquid crystal panel is also referred to as a Z-axis direction, a longitudinal direction of the optical module is also referred to as an X-axis direction, and a lateral direction of the optical module is also referred to as a Y-axis direction.

As illustrated in FIGS. 5 and 6, the optical module 1 according to the present technology includes a fixing part 52 that fixes an adjustment position of a phase difference compensation plate 50 in the Z-axis direction perpendicular to the main surface of the liquid crystal panel 11. By adopting the technology of fixing with the fixing part, even in a case where the optical module is miniaturized, it is possible to improve workability of positioning and workability of fixing work (for example, facilitate working procedures and shorten working hours) of the compensation plate that need to be adjusted for each liquid crystal panel. In addition, reworkability such as removal of a fixing agent and readjustment of a position of the compensation plate can be easily performed. Furthermore, by fixing with the fixing part, a state after positioning is easily maintained, and the quality of the optical module is easily maintained.

As illustrated in FIGS. 5 and 6, the optical module 1 of the present technology includes the phase difference compensation plate 50, a rotation body 41, a holder part 42, and the liquid crystal panel 11. It is preferable that the holder part 42 is provided with the fixing part 52 from the viewpoint of miniaturization and the like. In addition, it is preferable that the optical module 1 further includes a support plate 51 on a side facing the fixing part 52 in an arrangement direction of the phase difference compensation plate. It is more preferable that the support plate 51, the phase difference compensation plate 50, the rotation body 41, the holder part 42, and the liquid crystal panel 11 are disposed in this order in the optical module 1.

Figure 7:
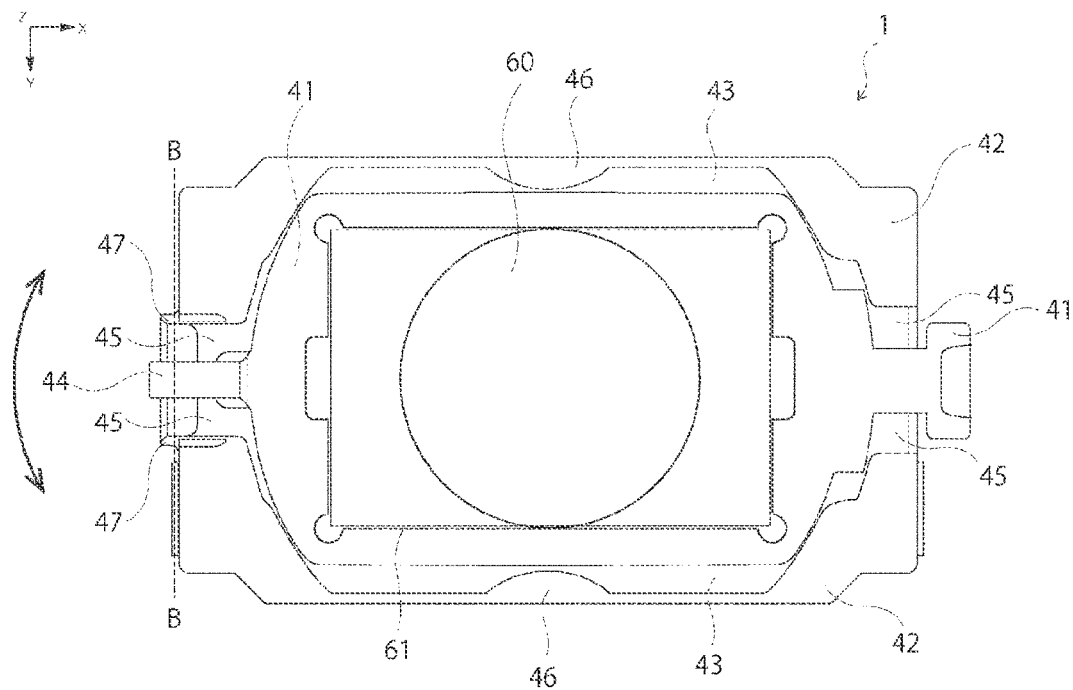
FIG. 7 is a plan view illustrating an example of the configuration of the optical module when a compensation plate is removed according to the present embodiment.

As illustrated in FIGS. 6 and 7, in the Z-axis direction of a central portion of the optical module 1, the liquid crystal panel 11, an opening 60, and the phase difference compensation plate 50 are disposed so that any light can pass through. The opening 60 may be a gap or a member through which light from the liquid crystal panel is transmitted, and is not particularly limited. In addition, on an optical path of the optical module 1, an optical path member (for example, a dichroic mirror, a total reflection mirror, a polarized beam splitter, a combining rhythm, and a projection lens) may be disposed as appropriate.

As illustrated in FIG. 6, the phase difference compensation plate 50 is preferably disposed between the liquid crystal panel 11 and the polarized beam splitter (not illustrated) of the liquid crystal panel, and is preferably disposed so as to face the polarized beam splitter. In addition, the optical module 1 according to the present technology may include a phase difference compensator including the phase difference compensation plate 50 between the liquid crystal panel 11 and the polarized beam splitter (not illustrated).

Note that the phase difference compensation plate (hereinafter also referred to as "compensation plate") is a member used to compensate residual phase difference of the liquid crystal panel and an optical member (for example, the polarized beam splitter). Examples of the compensation plate include, but are not particularly limited to, a film type compensation plate, a crystal type compensation plate, and a liquid crystal type compensation plate.

Figure 8:
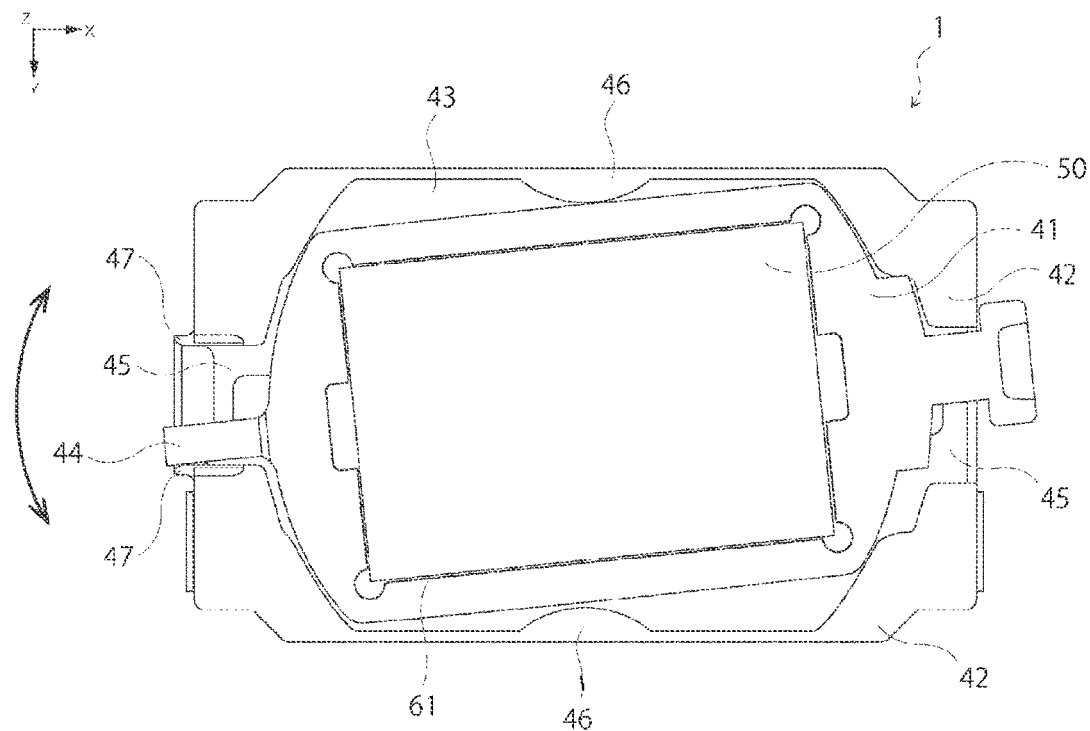
FIG. 8 is a plan view illustrating an example of operation of the optical module according to the present embodiment.

Furthermore, as illustrated in FIGS. 6 to 8, the optical module 1 includes the compensation plate 50 and the rotation body 41 for rotating the compensation plate 50. The rotation body 41 has a function, a structure, or a shape rotatable with an axial direction perpendicular to the main surface of the liquid crystal panel as a rotation axis. In addition, the optical module 1 preferably includes the holder part 42 capable of rotatably holding the rotation body 41 with the axial direction perpendicular to the main surface of the liquid crystal panel 11 as a rotation axis. The rotation body 41 and the holder part 42 are examples of rotation means in the present technology, but are not limited to the shape and the arrangement.

Furthermore, the optical module 1 preferably has, between the holder part 42 provided with the fixing part 52 and the support plate 51 provided on the side facing the fixing part 52, such a function, structure, or shape as to accommodate the rotation body 41 for rotating the compensation plate 50.

<2-1. Rotation Body>

In the present technology, the rotation body 41 preferably includes the opening 60 for disposing the compensation plate 50 in the Z-axis direction, and an angle adjustment member 44 (hereinafter also referred to as "adjustment member") that rotationally adjusts the compensation plate 50.

The opening 60 is preferably provided near the center of the rotation body, so that the compensation plate 50 is exposed. Examples of the shape of the opening 60 include, but are not particularly limited to, a circular shape and a polygonal shape (for example, quadrangular shape).

The adjustment member 44 is preferably formed to protrude outward from the rotation body 41. In addition, the adjustment member 44 may be formed to be connected to an end surface of the rotation body 41. As illustrated in FIGS. 7 and 8, by moving, in the Y-axis direction (arrow), the adjustment member 44 formed to protrude outward in the X-axis direction, the rotation body 41 is rotated in an arrow direction in conjunction with the movement of the adjustment member 44.

It is preferable that one or more adjustment members 44 are provided to the rotation body 41. Examples of the shape of the adjustment member 44 include, but are not particularly limited to, a columnar shape, an elliptical columnar shape, a rod shape, a quadrangular columnar shape, a hexagonal columnar shape, and a flat plate shape. The shape of the adjustment member 44 is more preferably a lever-operable shape from the viewpoint of operability of rotational adjustment. In addition, the shape of the adjustment member 44 is preferably a shape having a surface (for example, a flat surface) that is easily fixed by a fixing agent from the viewpoint of fixation maintenance and easy fixation. The shape of the adjustment member 44 is more preferably a lever shape and a shape having a surface for fixing by a fixing agent. The adjustment member 44 is preferably fixed to the fixing part in the Z-axis direction, and more preferably fixed by a fixing agent 54 applied to the fixing part 52.

The shape of the rotation body 41 is not particularly limited as long as the compensation plate can be rotationally adjusted after installation, but a shape that corresponds to the shape of a recess 43 of the holder part and is rotatable is preferable. Examples of the shape of the rotation body may include, but are not limited to, a round shape, an elliptical shape, a triangular shape, a quadrangular shape, a pentagonal shape, or a hexagonal shape. Furthermore, in a case where the rotation body has a polygonal shape, the rotation body may have an arc-shaped portion that protrudes outward in the longitudinal direction, or both ends in the longitudinal direction may be rounded. Furthermore, the rotation body preferably has a shape having a lever-shaped rotational adjustment member further protruding from at least one arc-shaped portion or rounded portion. Then, by forming the shape of the rotation body into a rectangular shape having an arc-shaped portion or a rounded portion in the longitudinal direction, the optical module can be further miniaturized while maintaining the size of the compensation plate.

The rotation body 41 has a mechanism capable of fixing the compensation plate 50, but a fixing position and a fixing method of the compensation plate are not particularly limited. The rotation body 41 may have a shape capable of sandwiching and fixing the compensation plate 50. In addition, as illustrated in FIG. 7, the rotation body 41 may have such a shape that a recess 61 is provided in an outer periphery of the opening 60, and the compensation plate 50 is installed in the recess 61 so that the compensation plate 50 can be fixed by a fixing agent or the like.

<2-2. Fixing Part>

In the present technology, the angle adjustment member 44 of the rotation body is preferably fixed in the direction perpendicular to the main surface of the liquid crystal panel 11 (Z-axis direction) after rotational adjustment. This fixing is preferably performed with the fixing part 52 provided in the optical module 1 (more specifically, the holder part 42). Thus, even in a case where the image display apparatus is miniaturized, an adjustment position of the compensation plate is easily adjusted when the compensation plate is fixed. In addition, after the compensation plate is fixed, the adjustment position of the compensation plate is easily maintained.

Figure 9:
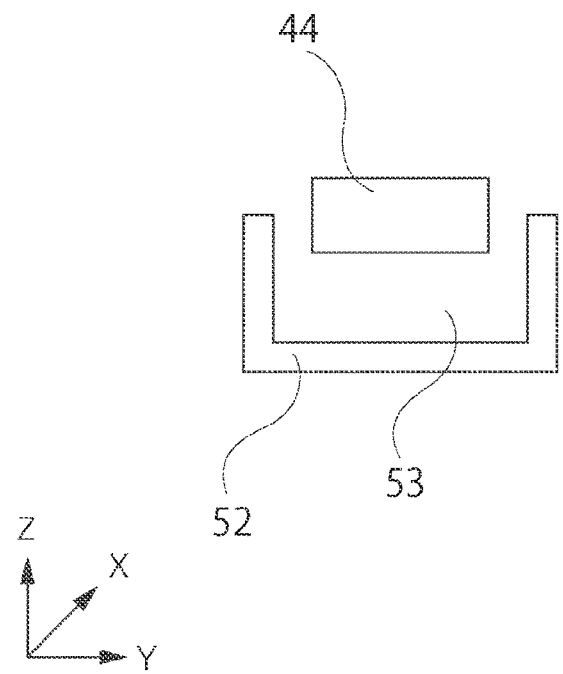
FIG. 9 is a cross-sectional view taken along a line B-B around a fixing part of the optical module according to the present embodiment.
Figure 10:
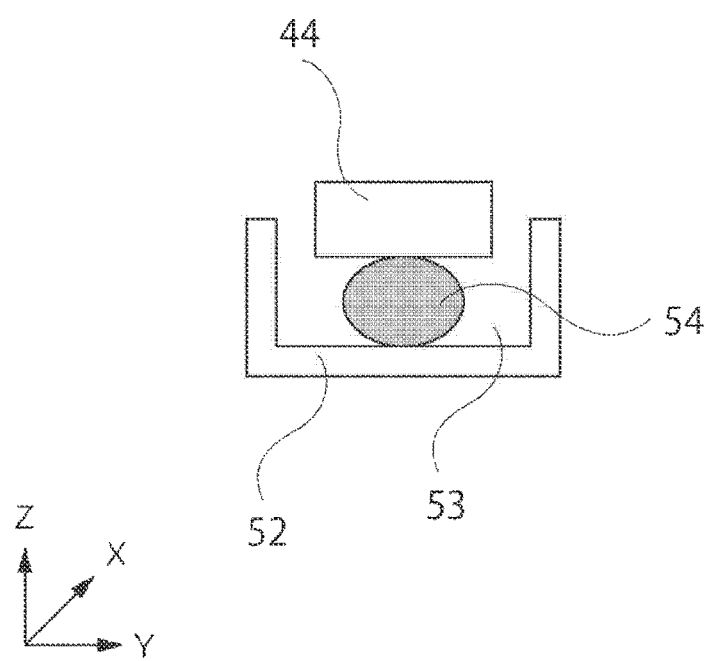
FIG. 10 is a schematic view of an example in which an angle adjustment member of a rotation body and the fixing part of a holder part are fixed by a fixing agent in the present embodiment.

It is preferable that one or more fixing parts 52 are provided in the holder part 42, and the fixing part 52 can be provided at a position where the rotation body 41 can be fixed. As illustrated in FIGS. 6 and 9 to 10, examples of an installation position of the fixing part 52 include a position where the adjustment member 44 of the rotation body can be fixed in the Z-axis direction. The installation position of the fixing part 52 may be in a direction of the polarized beam splitter 6 (not illustrated) or in a direction of the liquid crystal panel 11. From the viewpoint of workability of a fixing agent and the like, the fixing part 52 is preferably installed to be positioned in a lower direction of the compensation plate during work of rotationally adjusting the compensation plate.

The number of the fixing parts 52 is not particularly limited, but the number corresponding to the number of the adjustment members is preferable. In a case where the number of the adjustment members is singular, the number of the fixing parts 52 is more preferably singular.

Although means for fixing the rotation body 41 with the fixing part 52 is not particularly limited, it is more preferable to use a fixing agent. As illustrated in FIG. 9, from the viewpoint of workability and maintenance of fixing strength, it is more preferable that a recessed space (gap) is provided in the fixing part and the recessed space is used as a fixing agent application region 53. Furthermore, the fixing part 52 preferably has the fixing agent application region 53. Furthermore, the fixing part 52 more preferably has the recessed space (gap) 53 for the fixing agent application region in which a fixing agent can be filled. Since the shape of the fixing agent applied can be made constant, fixing work can be simplified and working time can be shortened.

It is preferable that, after rotational adjustment of the compensation plate by the adjustment member 44, as illustrated in FIG. 10, the gap 53 is filled with the fixing agent 54, and the adjustment member 44 and the fixing part 52 are fixed via the fixing agent 54. Thus, a position of the compensation plate is fixed and maintained in a state where the compensation plate is adjusted.

<2-3. Fixing Agent>

Examples of the fixing agent 54 include an adhesive. The type of the adhesive is not particularly limited, but from the viewpoint of workability and adhesive strength, a curable adhesive is preferable, and a photocurable resin adhesive is more preferable. Visible light and/or ultraviolet curable resin adhesives are even more preferable. Thus, the adjustment member 44 is easily fixed while a position where the compensation plate is rotationally adjusted is maintained, and the quality after the rotational adjustment and fixation is also easily maintained. In addition, in the present technology, it is not necessary to consider a problem of reworkability due to the use of the fixing agent and thermal expansion and contraction peculiar to the fixing agent, and advantages of the fixing agent can be utilized.

<2-4. Holder Part>

In addition, a mechanism, a structure, or a shape of the holder part 42 is not particularly limited in the present technology. The holder part 42 preferably has a mechanism, a structure, or a shape capable of rotatably holding the rotation body 41 therein. In addition, the holder part 42 is preferably configured to hold the liquid crystal panel 11 therein (see FIG. 6). In addition, the holder part 42 is preferably provided with the fixing part 52 for fixing an adjustment position of the compensation plate in the Z-axis direction.

The shape of the holder part 42 is not particularly limited. Examples of the shape (in the X-axis direction and the Y-axis direction) of the holder part 42 viewed from the Z-axis direction include a circular shape, a quadrangular shape, and a polygonal shape. Among these, a quadrangular shape (more preferably, a rectangular shape) is preferable (see FIG. 7). Furthermore, the holder part 42 may have a mechanism capable of being fixed to a member of another optical module, and may further have a structure or a shape such as a recess or a projection in the shape of the holder part.

As illustrated in FIG. 7, on a flat surface of the holder part 42 (in the X-axis direction and the Y-axis direction), the recess 43 in which the rotation body 41 can be disposed is preferably provided. The recess 43 is preferably formed to accommodate the rotation body 41, which facilitates miniaturization of the optical module. By installation of the rotation body 41 in the recess 43, the rotation body 41 can be made rotatable and held. Since the rotation body 41 is rotatable, rotational adjustment of the compensation plate 50 fixed to the rotation body 41 can be easily performed.

Furthermore, the holder part 42 and the support plate 51 are preferably configured to provide a space for sandwiching the rotation body 41 between the recess 43 and the support plate 51. The rotation body 41 can be accommodated in the space provided by such a configuration, and the accommodated rotation body 41 is rotatable, which is preferable. Thus, the optical module can be further miniaturized, and compensation adjustment of the liquid crystal panel can be easily and accurately performed regardless of whether the optical module is disposed vertically, horizontally, or the like.

As illustrated in FIG. 7, an outer edge of the recess 43 is preferably provided with one or more opening regions 45 and/or protrusions 46. By formation of the opening region 45 and/or the protrusion 46, the rotation body 41 can be made rotatable and held more easily.

It is preferable that one or more opening regions 45 are provided on outer edges of the holder part 42 along a lateral direction (Y-axis direction). The opening region 45 is preferably formed with a space in which the adjustment member 44 of the rotation body can move. The opening region 45 is preferably provided in a central portion in the lateral direction and/or a central portion in a longitudinal direction. It is more preferable that one or more opening regions 45 are formed in a longitudinal direction of the recess 43 so that the adjustment member 44 of the rotation body 41 can move, and it is more preferable that the opening region 45 is formed near the center at an end in the longitudinal direction.

Furthermore, in a lateral direction of the opening region 45 (Y-axis direction), a protrusion 47 for restricting movement of the adjustment member 44 of the rotation body may be provided. The protrusion 47 protrudes in the Z-axis direction, and by provision of the protrusion, a range of rotational movement of the rotation body 41 is determined, and rotational adjustment is easily performed.

It is preferable that one or more protrusions 46 are provided on the outer edges of the holder part 42 along the longitudinal direction (X-axis direction). The protrusion 46 is preferably formed at a central portion of the outer edge along the longitudinal direction (X-axis direction). The protrusion 46 is preferably formed on the outer edge toward the inside in the lateral direction (Y-axis direction). Furthermore, it is preferable that one protrusion 46 is formed on each of the outer edges along the longitudinal direction, and the protrusion 46 is formed at the central portion in the longitudinal direction.

Examples of the shape of the protrusion 46 include an elliptical shape, a circular shape, a semicircular shape, a triangular shape, and a hexagonal shape, and a semicircular shape is preferable from the viewpoint of easy rotation, but the shape is not limited to the shapes described above. The protrusions 46 and 46 protruding inward in the lateral direction are brought into contact with sides of the rotation body 41 along the longitudinal direction, so that rotation of the rotation body 41 can be adjusted.

In addition, as illustrated in FIG. 7, the shape of the outer edge of the holder part 42 along a lateral direction of the recess 43 (Y-axis direction) is not particularly limited, but is preferably an arc shape that protrudes outward. The arc shape of the outer edge is brought into contact with the rounded portion of the end of the rotation body 41 in the longitudinal direction, so that rotation of the rotation body 41 can be easily adjusted. Furthermore, the central portion of the arc shape of the outer edge is preferably opened toward the outside to form the opening region 45.

<2-5. Support Plate>

In the present technology, it is preferable that the optical module 1 further includes the support plate 51 for suppressing expansion in the Z-axis direction of the adjustment member 44. It is preferable that the optical module 1 further includes the support plate 51 on the side facing the fixing part 52. When the fixing part 52 is filled with a fixing agent, the fixing agent may expand in the Z-axis direction depending on a filling amount, and particularly, the fixing agent may expand in the direction of the adjustment member 44 of the rotation body. By disposing the support plate 51 in the Z-axis direction of the fixing part 52 (preferably in an installation direction of the compensation plate), expansion can be easily suppressed.

In addition, the support plate 51 is preferably disposed so as to face a surface of the recess 43 that accommodates the rotation body 41. The support plate 51 is more preferably disposed so that the rotation body 41 can be accommodated between the support plate 51 and the recess of the holder part 42. Thus, the support plate 51 can hold the rotation body 41 together with the holder part 42.

3. Method of Manufacturing Optical Module and Image Display Apparatus of Present Technology Hereinafter, an example of a method of manufacturing the optical module 1 or the image display apparatus according to the present technology will be described together with a method of fixing an adjustment position of the compensation plate by using constituent members of the above-described optical module of the present technology (see, for example, FIGS. 8 to 10).

The adjustment member 44 of the rotation body 41 is adjusted in the Y-axis direction to determine a preferable position of the compensation plate 50, and then the compensation plate 50 is fixed in the Z-axis direction of the adjustment member 44. Thus, the optical module 1 in which the compensation plate is rotationally adjusted can be manufactured.

The Z-axis direction of the adjustment member 44 is more preferably fixed by the fixing agent 54 (more preferably, an adhesive) to the fixing part 52. Furthermore, the fixing part 52 is preferably provided with the gap 53 for filling the fixing agent 54.

Furthermore, in a case where the fixing agent 54 is a photocurable resin adhesive, it is preferable that, after the adjustment member 44 is adjusted, the fixing part 52 is filled with the adhesive 54 from an optional direction and irradiated with predetermined light to fix the adjustment member 44 and the fixing part 52. In addition, after the fixing part 52 is filled with the adhesive from the optional direction, the adjustment member 44 can be adjusted and the fixing part 52 can be irradiated with predetermined light to fix the adjustment member 44 and the fixing part 52.

Incidentally, a projection type image display apparatus such as a projector using a liquid crystal panel includes an optical module in which a compensation plate is disposed between a light source and the liquid crystal panel, and the compensation plate is rotated to align polarization directions, thereby lowering illuminance at the time of an all-black screen. At the time of manufacturing the projection type image display apparatus, the compensation plate is adjusted in such a way and fixed. However, when the compensation plate is moved in a direction of rotation from an adjustment position after manufacturing, the illuminance at the time of an all-black screen is lowered, a contrast is lowered, and performance deteriorates. Therefore, it is necessary to hold the compensation plate so that a rotational position of the compensation plate does not move from the adjusted position, and examples of a holding method include a method of fixing the compensation plate with an adhesive or the like.

In addition, a trend toward miniaturization of image display apparatuses is being promoted, and for the miniaturization, it is advantageous to adopt an optical design in which a distance between a polarized beam splitter and the liquid crystal panel is made close to each other. A distance between the polarized beam splitter and the compensation plate is narrowed because the compensation plate needs to be placed between the polarized beam splitter and the liquid crystal panel for miniaturization. In the manufacture of the image display apparatus, it is necessary to rotationally adjust the compensation plate as appropriate and then fix the compensation plate corresponding to the liquid crystal panel and the polarized beam splitter, and the compensation plate cannot be fixed in advance.

As the holding method, Patent Documents 1 and 2 disclose a fixing method using a fixing tool such as a screw. In a case where the image display apparatus is miniaturized by disposing the polarized beam splitter, the compensation plate, and the liquid crystal panel in this order, the distance between them is narrow. Accordingly, the polarized beam splitter and the liquid crystal panel become shields, and screw fastening work becomes difficult. In addition, a screw fixing part may become a shield for an optical path. If the screw fixing part is disposed to be separated in longitudinal and lateral directions and a thickness direction of the optical module in consideration of the arrangement of the polarized beam splitter, the screw fastening work can be performed, but it is difficult to achieve miniaturization. In addition, in the case of fixing by screws, workability is not good because it is necessary to fix several places and adjust a fastening balance of each screw. In addition, since the screws may be loosened due to vibration or the like, an adjustment position of the compensation plate may not be maintained.

In addition, as another holding method, a method can be considered in which a lever for rotating the compensation plate is disposed, stopper portions in a movable region are provided at both ends in a rotation direction of the lever, and the lever and the stopper portions are fixed by an adhesive after rotational adjustment. However, in this case, in the vicinity of the lever fixed by the adhesive, an optical path such as the compensation plate exists, heat of light or a heat source such as a light source is easily approached due to miniaturization, and heat is hardly radiated. Accordingly, the vicinity of the lever fixed by the adhesive is a portion where the temperature greatly changes during lighting of the projector, and expansion and contraction of the adhesive occur due to the temperature change. Thus, in a case where the rotation direction of the lever is fixed by the adhesive, since the rotation direction and a direction of the expansion and contraction of the adhesive are the same, force is exerted in a direction in which the compensation plate is rotated by the expansion and contraction of the adhesive. In addition, when an application width of the adhesive (widths of the lever and the stopper) is wide, an amount of variation becomes large and it tends to be difficult to maintain adjustment. In addition, in a case where the adhesive is fixed to the stopper portion by a left side of the lever, it is necessary to spread the adhesive, which increases work difficulty.

In addition, when the lever and the stopper are fixed by the adhesive in the rotation direction of the lever (Y-axis direction), the adhesive may remain between the lever and the stopper during rework. If the adhesive remains, an adjustable range of the lever decreases, and rotational adjustment may not be performed. It takes time to remove the residual adhesive to solve this problem.

Thus, in a case where the method of fixing the lever and the stopper portion (in the Y-axis direction) by the adhesive is adopted, there is a high possibility that workability is lowered, and that an adjustment position is moved.

In addition, as another holding method, Patent Document 3 proposes a method of suppressing an influence of expansion and contraction of an adhesive. However, in Patent Document 3, a mechanical component needs to have a shape for balancing force generated during expansion and contraction of the adhesive, and the shape is complicated. In addition, when the shape of the mechanical component of Patent Document 3 is adopted, two corresponding adhesive application points are required, which complicates adhesive application work and increases working time. In addition, if an adhesive application position is deviated, there is a concern that a force balance will be lost and unintended movement will occur.

In contrast, in a case where the optical module of the present technology is adopted, since the compensation plate is fixed in the Z-axis direction, the compensation plate does not move in the rotational direction due to expansion and contraction of the fixing agent, which is advantageous for maintenance of an adjustment position of the compensation plate. In addition, in a case where the fixing agent is used for fixing in the present technology, since the shape of the fixing agent applied is constant, fixing work can be simplified and working time can be shortened. Since the fixing part is fixed to the adjustment member in the Z-axis direction as in the present technology, even if a filling amount of the fixing agent in the fixing part increases, an adjustment direction of the adjustment member is not affected, so that workability is facilitated. In the present technology, if the adhesive can be removed to the extent that the adjustment member can be moved, the adjustment member becomes movable, and since there is no fixing agent in the adjustment direction, the rotation direction is not affected, so that reworkability is also good. Thus, by adopting the present technology, even in a case where the image display apparatus is miniaturized, an adjustment position of the compensation plate is easily maintained. Furthermore, by adopting the present technology, workability of adjusting a position of the compensation plate is facilitated, readjustment of the position of the compensation plate is also easy even after the adjustment position of the compensation plate is fixed, and reworkability is also excellent.

4. Projection Type Image Display System or Projection Type Image Display Apparatus of Present Technology An example of the image display system or the image display apparatus including the optical module 1 of the present technology will be described below, but the present technology is not limited to the example.

Figure 11:
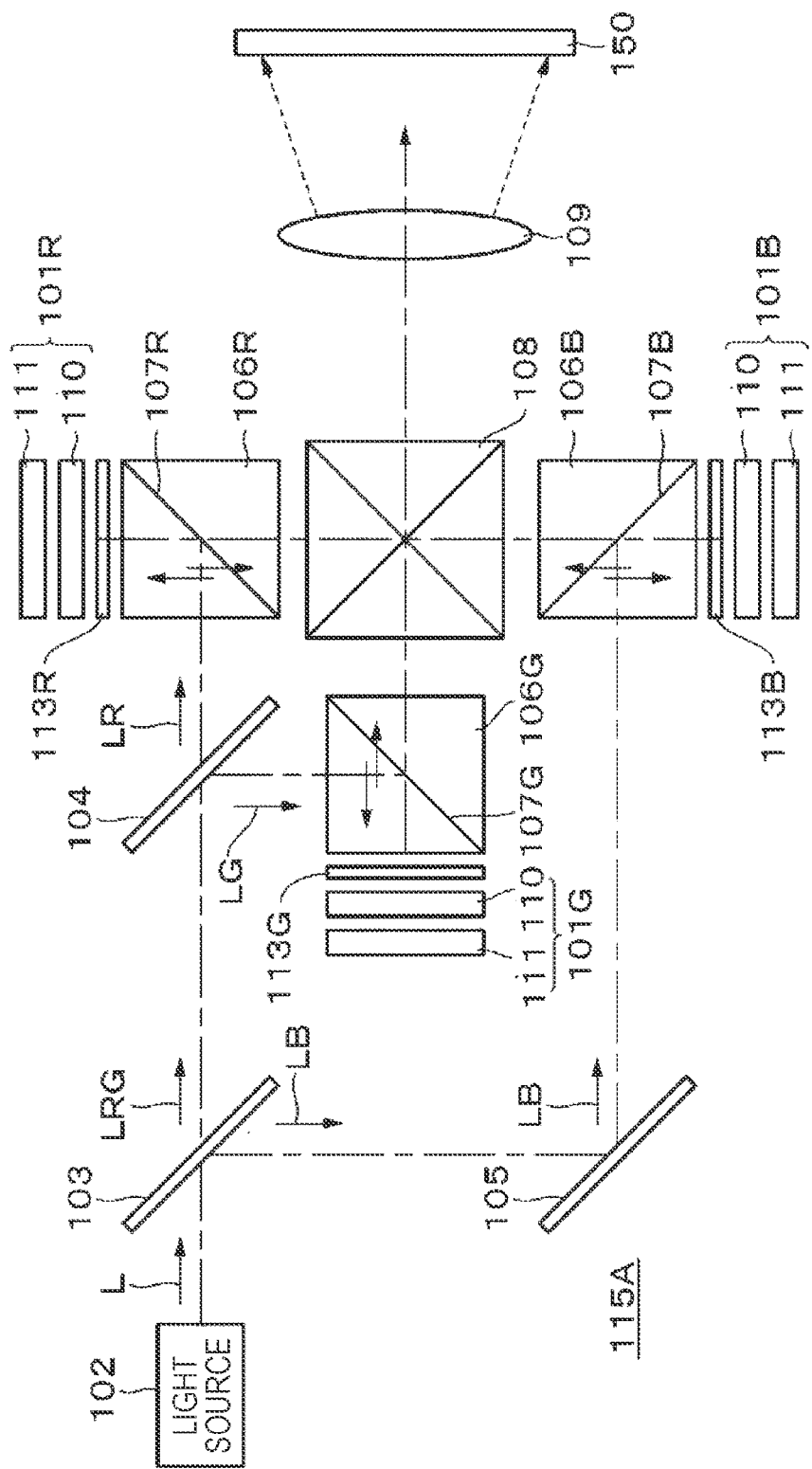
FIG. 11 is a schematic diagram illustrating an example of a configuration of the projection type image display system according to the embodiment of the present technology.
Figure 12:
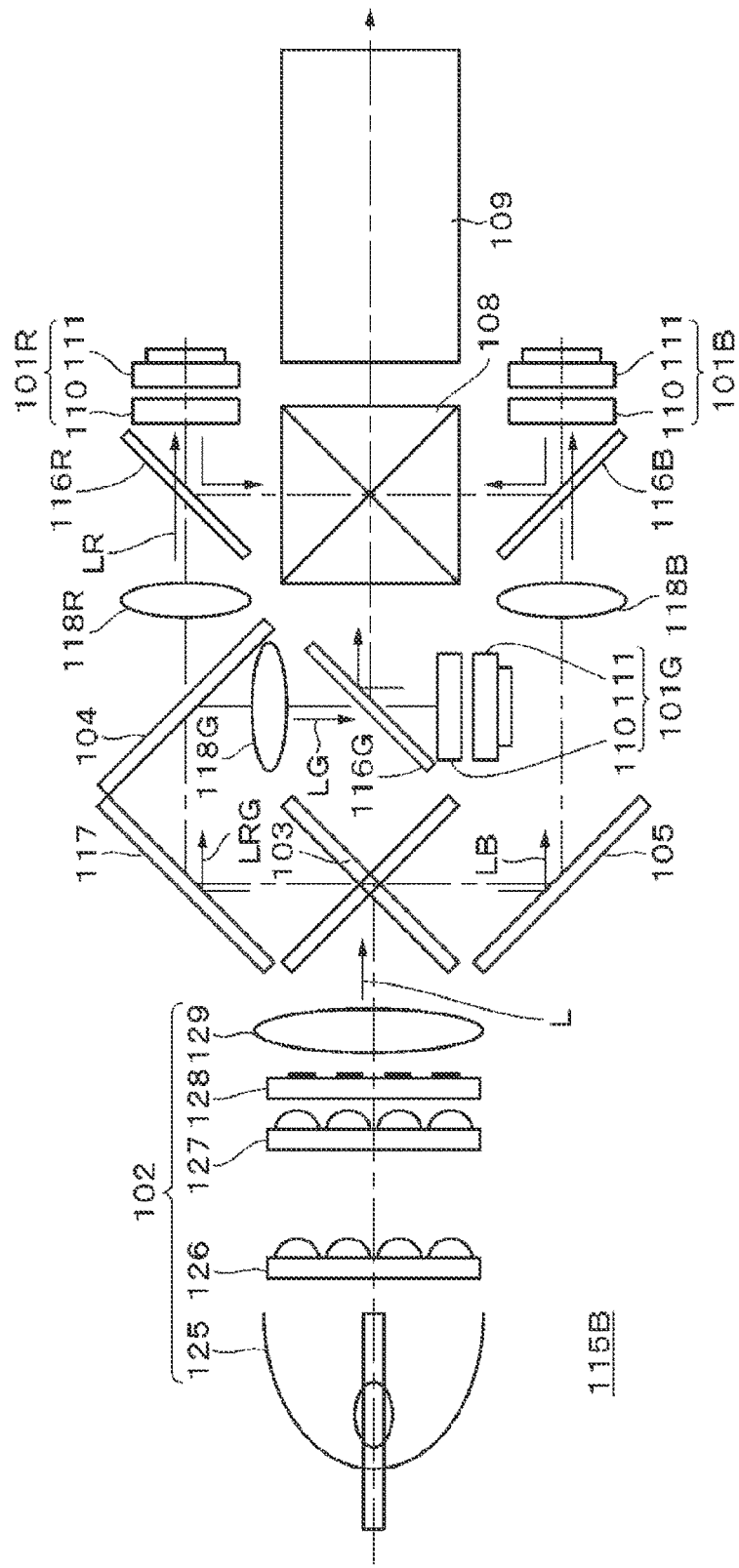
FIG. 12 is a schematic diagram illustrating an example of the configuration of the projection type image display system according to the embodiment of the present technology.
Figure 13:
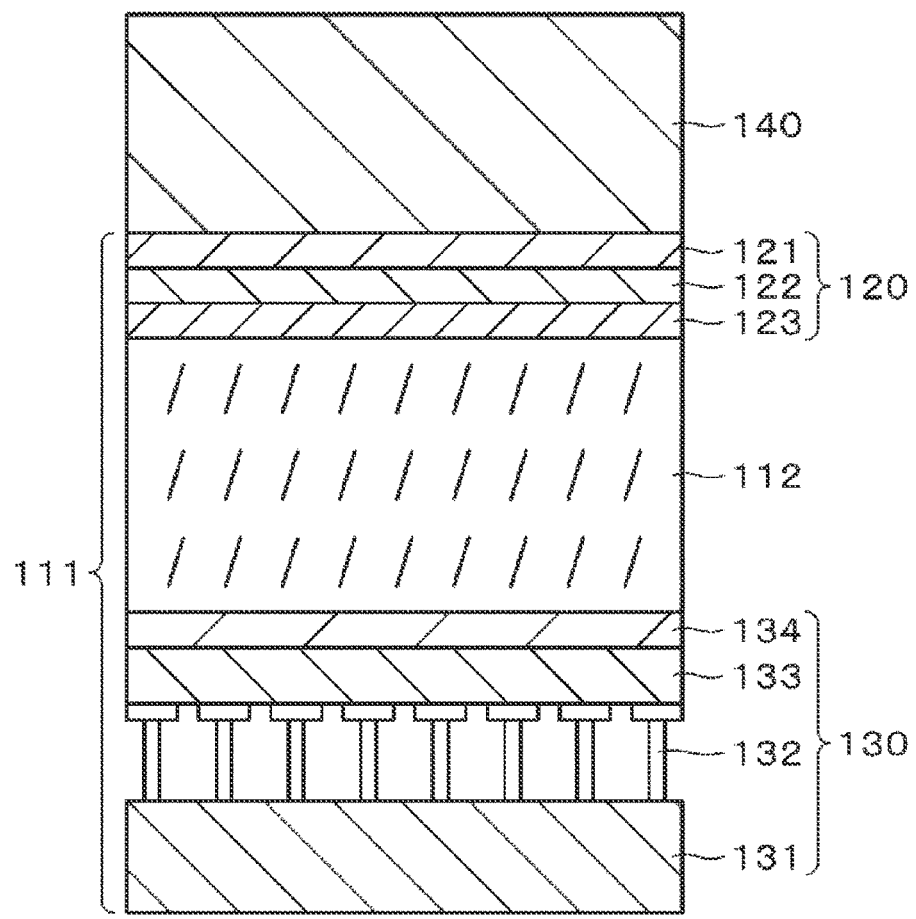
FIG. 13 is a cross-sectional view illustrating an example of a configuration of a liquid crystal display device.

FIGS. 11 and 12 are schematic diagrams each illustrating an example of a configuration of the projection type image display system according to the embodiment of the present technology, but the projection type image display apparatus and system according to the present technology are not limited to the example. In addition, FIG. 13 illustrates a cross-sectional view illustrating an example of a configuration of an optical liquid crystal display device used in the optical module of the present technology.

<Configuration of Projection Type Image Display System>

FIG. 11 is a schematic diagram illustrating an example of a configuration of the projection type image display system and the projection type image display apparatus according to the embodiment of the present technology. A projection type display system 115A is a so-called three-panel liquid crystal projector apparatus that displays a color image using three liquid crystal light valves for each color of red, green, and blue. As illustrated in FIG. 11, the projection type image display system 115A includes liquid crystal display devices 101R, 101G, and 101B, a light source 102, dichroic mirrors 103 and 104, a total reflection mirror 105, polarized beam splitters 106R, 106G, and 106B, a combining prism 108, and a projection lens 109. The projection type image display system or the projection type image display apparatus of the present technology may be provided with, as liquid crystal display devices, the above-described optical module according to the present technology and a phase difference compensator including the optical module.

The light source 102 emits light source light (white light) L including a blue light beam LB, a green light beam LG, and a red light beam LR, which is required for displaying color images, and can include, for example, a halogen lamp, a metal hydride lamp, a xenon lamp, or an LED.

The dichroic mirror 103 has a function of separating the light source light L into the blue light beam LB and other colored light beams LRG. The dichroic mirror 104 has a function of separating the light beams LRG that have passed through the dichroic mirror 103 into the red light beam LR and the green light beam LG. The total reflection mirror 105 reflects the blue light beam LB separated by the dichroic mirror 103 toward the polarized beam splitter 106B.

The polarized beam splitters 106R, 106G, and 106B are prism-type polarization separation elements provided along optical paths of the red light beam LR, the green light beam LG, and the blue light beam LB, respectively. These polarized beam splitters 106R, 106G, and 106B have polarization separation surfaces 107R, 107G, and 107B, respectively, and have a function of separating, on the polarization separation surfaces 107R, 107G, and 107B, the corresponding incident colored light beam into two polarization components intersecting each other. Each of the polarization separation surfaces 107R, 107G, and 107B reflects one polarization component (for example, an S-polarized component), and pass another polarization component (for example, a P-polarized component).

The liquid crystal display devices 101R, 101G, and 101B receive colored light having a predetermined polarization component (for example, an S-polarized component) separated by the polarization separation surfaces 107R, 107G, and 107B of the polarized beam splitters 106R, 106G, and 106B. The liquid crystal display devices 101R, 101G, and 101B are driven in accordance with a drive voltage applied on the basis of an image signal, and have a function of modulating the incident light and reflecting the modulated light toward the polarized beam splitters 106R, 106G, and 106B.

Between the polarized beam splitters 106R, 106G, and 106B and liquid crystal panels 111 of the liquid crystal display devices 101R, 101G, and 101B, quarter wave plates 113R, 113G, and 113B are disposed, respectively, and phase difference compensators 110 are disposed. The quarter wave plates 113R, 113G, and 113B have a function of correcting lowering of contrast caused by angular dependence of incident light of the polarized beam splitters 106R, 106G, and 106B. The phase difference compensators 110 have a function of compensating residual phase difference of the liquid crystal panels constituting liquid crystal display devices 101R, 101G, and 101B.

The combining prism 108 has a function of combining colored light beams having predetermined polarization components (for example, P-polarized components) emitted from the liquid crystal display devices 101R, 101G, and 101B and transmitted through the polarized beam splitters 106R, 106G, and 106B. The projection lens 109 has a function of projecting the combined light emitted from the combining prism 108 toward the screen 150.

<Operation of Projection Type Image Display Apparatus>

Operation of the projection type image display apparatus 115 A configured as described above will be described.

The white light L emitted from the light source 102 is separated into the blue light beam LB and the other colored light beams (red light beam and green light beam) LRG by the function of the dichroic mirror 103. Among these, the blue light beam LB is reflected toward the polarized beam splitter 106B by the function of the total reflection mirror 105.

On the other hand, the other colored light beams (red light beam and green light beam) LRG are further separated into a red light beam LR and a green light beam LG by the function of the dichroic mirror 104. The separated red light beam LR and the separated green light beam LG are incident on the polarized beam splitters 106R and 106G, respectively.

The polarized beam splitters 106R, 106G, and 106B separate, on the polarization separation surfaces 107R, 107G, and 107B, the corresponding incident colored light beams into two polarization components intersecting each other. At this time, each of the polarization separation surfaces 107R, 107G, and 107B reflects one polarization component (for example, an S-polarized component) toward the corresponding one of the liquid crystal display devices 101R, 101G, and 101B. The liquid crystal display devices 101R, 101G, and 101B are driven in accordance with a drive voltage applied on the basis of image signals, and modulate corresponding incident colored light beams having predetermined polarization components in pixel units.

The liquid crystal display devices 101R, 101G, and 101B reflect the corresponding modulated colored light beams toward the polarized beam splitters 106R, 106G, and 106B. The polarized beam splitters 106R, 106G, and 106B pass only predetermined polarization components (for example, P-modulation components) among the light beams (modulated light beams) reflected from the liquid crystal display devices 101R, 101G, and 101B and emit the predetermined polarization components toward the combining prism 108.

The combining prism 108 combines the colored light beams having the predetermined polarization components that have passed through the polarized beam splitters 106R, 106G, and 106B, and emits the combined colored light toward the projection lens 109. The projection lens 109 projects the combined light emitted from the combining prism 108 toward the screen 150. Thus, an image corresponding to the light modulated by the liquid crystal display devices 101R, 101G, and 101B is projected on the screen 150, and a desired image display is performed.

FIG. 12 is a schematic diagram illustrating another example of the configuration of the projection type image display apparatus according to the embodiment of the present technology. A projection type image display apparatus 115B includes, as polarization separation elements, wire grid polarization elements 116R, 116R, and 116B instead of the prism-type polarized beam splitters 106R, 106G, and 106B illustrated in FIG. 11. Note that the parts corresponding to those of the projection type image display apparatus illustrated in FIG. 11 are denoted by the same reference numerals.

Since the wire grid polarization elements 116R, 116G, and 116R have small angular dependence of incident light compared with the prism-type polarized beam splitters 106R, 106G, and 106B and are also excellent in heat resistance, a quarter wave plate is not required, and can be suitably used as polarization separation elements for the projection type image display apparatus 115B using the light source 102 having a large quantity of light. The projection type image display apparatus 115B also displays an image on a screen (not illustrated) by similar operation to that in the projection type image display system 115A illustrated in FIG. 11.

The projection type image display apparatus 115B further includes a total reflection mirror 117 and relay lenses 118R, 118G, and 118B. The total reflection mirror 117 reflects light beams LRG separated by the dichroic mirror 103 toward the dichroic mirror 104. The relay lens 118R is provided in an optical path between the dichroic mirror 104 and the wire grid polarizer 116R. The relay lens 118G is provided in an optical path between the dichroic mirror 104 and the wire grid polarizer 116G. The relay lens 118B is provided in an optical path between the total reflection mirror 105 and the wire grid polarizer 116B.

FIG. 12 illustrates an example of a configuration of the light source 102. The light source 102 includes a lamp unit 125 that generates light source light L, a pair of microlens arrays 126 and 127 that uniformizes luminance of the light source light L, a PS conversion element 128 that converts a polarization direction of the light source light L into a polarized wave in one direction, and a position adjustment lens 129 that adjusts an irradiation position of the light source light L.

Each of the wire grid polarizers 116R, 116G, and 116B is a grid of a plurality of thin metallic wires having a pitch, width, and height smaller than a wavelength of incident light formed on a transparent substrate such as glass. The wire grid polarizers 116R, 116G, and 116B having such a configuration function as polarizers in the case of being disposed perpendicular to the incident light. On the other hand, the wire grid polarizers 116R, 116G, and 116B function as polarized beam splitters in the case of being disposed non-perpendicular to the incident light as illustrated in FIG. 12. In addition, in a case where the wire grid polarizers 116R, 116G, and 116B are used as polarized beam splitters, it is preferable that a polarizing plate is used for the liquid crystal display device for image quality, and for example, it is preferable that a quarter wave plate is used for a compensation plate.

<Liquid Crystal Display Device>

FIG. 13 is a cross-sectional view illustrating an example of a configuration of an optical module including the liquid crystal panel 111 and a phase difference compensator 140, but the present technology is not limited the example. As illustrated in FIG. 13, each of optical modules 101R, 101G, and 101B includes a liquid crystal panel 111 serving as a light valve, and the phase difference compensator 140 provided on a surface of the liquid crystal panel 111. The optical module of the present technology includes a fixing part that fixes an adjustment position of a phase difference compensation plate in the Z-axis direction. In addition, the phase difference compensator 140 includes a compensation plate, a rotation body, and a holder part. The phase difference compensator 110 is provided on a surface of the liquid crystal panel 111 on a side corresponding to the polarized beam splitter 106R, 106G, or 106B or the wire grid polarizer 116R, 116G, or 116B.

The liquid crystal panel 111 is, for example, a reflective vertical composition liquid crystal display element in which liquid crystal molecules are vertically aligned in a state where no voltage is applied, and includes a counter substrate 120 and a pixel electrode substrate 130 disposed to face each other, and a liquid crystal layer 112 formed by enclosing liquid crystal between the counter substrate 120 and the pixel electrode substrate 130. As the liquid crystal constituting the liquid crystal layer 112, liquid crystal having negative dielectric anisotropy, for example, nematic liquid crystal having negative dielectric anisotropy can be used.

The counter substrate 120 is constituted by sequentially laminating, on a transparent substrate 121, a transparent electrode 122 and an alignment film 123. Examples of the transparent substrate 121 include a glass substrate including soda glass, non-alkali glass, or quartz glass. The transparent electrode 122 includes, for example, a transparent conductive oxide material such as indium tin oxide (ITO) which is a solid solution of tin oxide ($SnO_2$) and indium oxide ($In_2O_3$). The transparent electrode 122 is at a potential common to all pixel regions (for example, a ground potential).

The alignment film 123 includes, for example, a polyimide organic compound. A surface of the alignment film 123 on a side of the liquid crystal layer 112 is subjected to rubbing treatment in order to align liquid crystal molecules constituting the liquid crystal layer 112 in a predetermined direction.

The pixel electrode substrate 130 is constituted by sequentially laminating, on a support substrate 131, a reflective electrode layer 133, and an alignment film 134. The support substrate 131 is, for example, a silicon substrate, and on the support substrate 131, a switching element 132 of, for example, a complementary metal oxide semiconductor (C-MOS) type is provided. The reflective electrode layer 133 includes a plurality of reflective pixel electrodes. A driving electrode is applied to the pixel electrodes by the above-described switching element 132.

As a material constituting the pixel electrode, a material exhibiting a high reflectivity to visible light is preferable, and aluminum is used, for example. As is the case with the alignment film 123 of the counter substrate 120, the alignment film 134 includes, for example, a polyimide organic compound, and a surface of the alignment film 134 on a side of the liquid crystal layer 112 is subjected to rubbing treatment in order to align the liquid crystal molecules constituting the liquid crystal layer 112 in a predetermined direction.

The phase difference compensator 140 is provided between each of the polarized beam splitters 106R, 106G, and 106B or each of the wire grid polarizers 116R, 116G, and 116B and a front surface of each of the liquid crystal panels 111. The contrast can be adjusted by rotating the phase difference compensator 140 with an axis perpendicular to the liquid crystal panel 111 as a rotation axis and appropriately setting a rotation angle of a slow axis of each phase difference compensator 140 with respect to a slow axis of the liquid crystal panel 111. As the phase difference compensator 110, a compensation plate or the like is used.

The projection type image display apparatuses 115A and 115B preferably include the optical module 1 of the present technology and the phase difference compensator. As the compensation plate or the like, for example, those disclosed in Patent Documents 1 and 2 and the like may be used. Thus, the surface of the liquid crystal panel 111 may be provided with the phase difference compensator 140 having both functions of phase compensation and antireflection. Therefore, even in a case where the image display apparatus is miniaturized, an adjustment position of the compensation plate is easily maintained, excellent contrast can be achieved, and utilization efficiency of light source light L emitted from a light source can be enhanced.

Note that the present technology can also have the following configurations.

[1]
An optical module including a fixing part that fixes an adjustment position of a phase difference compensation plate in a Z-axis direction perpendicular to a main surface of a liquid crystal panel.

[2]
The optical module according to [1], in which the fixing part is provided to a holder part.

[3]
The optical module according to [1] or [2], in which the fixing part has a region for applying a fixing agent.

[4]
The optical module according to any one of [1] to [3], in which the region for applying a fixing agent includes a recessed space.

[5]
The optical module according to any one of [1] to [4], in which the fixing agent includes an adhesive.

[6]
The optical module according to any one of [1] to [5], further including an angle adjustment member that rotationally adjusts the phase difference compensation plate,
in which the angle adjustment member is fixed to the fixing part in the Z-axis direction.

[7]
The optical module according to any one of [1] to [6], in which the angle adjustment member is fixed by a fixing agent applied to the fixing part.

[8]
The optical module according to any one of [1] to [7], further including a support plate on a side facing the fixing part.

[9]
The optical module according to any one of [1] to [8], in which the holder part holds a rotation body that rotates the phase difference compensation plate.

[10]
The optical module according to any one of [1] to [9], in which a rotation body that rotates the phase difference compensation plate is accommodated between a holder part provided with the fixing part and a support plate provided on a side facing the fixing part.

[11]
The optical module according to any one of [1] to [10], in which the phase difference compensation plate is disposed between the liquid crystal panel and a polarized beam splitter of the liquid crystal panel.

[12]
A projection type image display apparatus including:

a light source;

a rotation body that rotationally adjusts, by an angle adjustment member, a phase difference compensation plate disposed between a liquid crystal panel and a polarized beam splitter of the liquid crystal panel; and a holder part that fixes the angle adjustment member of the rotation body to a fixing part in a Z-axis direction perpendicular to a main surface of the liquid crystal panel.

[13]

A projection type image display apparatus including: a light source; and the optical module according to any one of [1] to [11].

[14]

A method of manufacturing an optical module, the method including fixing an adjustment position of a phase difference compensation plate in a Z-axis direction perpendicular to a main surface of a liquid crystal panel.

[15]

A method of manufacturing the optical module according to any one of [1] to [11].

REFERENCE SIGNS LIST

1000 Projection type image display apparatus
1 Optical module
11 Liquid crystal panel
41 Rotation body
42 Holder part
44 Angle adjustment member
50 Phase difference compensation plate
51 Support plate
52 Fixing part
53 Gap
54 Fixing agent
60 Opening

The invention claimed is:

1. An optical module, comprising:
a fixing part configured to fix an adjustment position of a phase difference compensation plate in a Z-axis direction, wherein
the Z-axis direction is perpendicular to a main surface of a liquid crystal panel,
the fixing part has a region to apply a fixing agent,
the fixing agent is different from the fixing part, and
the region to apply the fixing agent includes a recessed space.

2. The optical module according to claim 1, wherein the fixing part is on a holder part.

3. The optical module according to claim 1, wherein the fixing agent includes an adhesive.

4. The optical module according to claim 1, further comprising an angle adjustment member configured to rotationally adjust the phase difference compensation plate, wherein the angle adjustment member is fixed to the fixing part in the Z-axis direction.

5. The optical module according to claim 4, wherein the angle adjustment member is configured to be fixed by the fixing agent applied to the fixing part.

6. The optical module according to claim 1, further comprising a support plate on a side opposite to the fixing part.

7. The optical module according to claim 2, wherein the holder part is configured to hold a rotation body that rotates the phase difference compensation plate.

8. The optical module according to claim 1, wherein
a rotation body that rotates the phase difference compensation plate is between a holder part and a support plate,
the holder part is with the fixing part, and
the support plate is on a side opposite to the fixing part.

9. The optical module according to claim 1, wherein the phase difference compensation plate is between the liquid crystal panel and a polarized beam splitter of the liquid crystal panel.

10. A projection type image display apparatus, comprising:
a light source;
a rotation body configured to rotationally adjust, by an angle adjustment member, a phase difference compensation plate between a liquid crystal panel and a polarized beam splitter of the liquid crystal panel; and
a holder part configured to fix the angle adjustment member of the rotation body to a fixing part in a Z-axis direction, wherein
the Z-axis direction is perpendicular to a main surface of the liquid crystal panel,
the fixing part has a region to apply a fixing agent,
the fixing agent is different from the fixing part, and
the region to apply the fixing agent includes a recessed space.

11. A method of manufacturing an optical module, the method comprising:
fixing, by a fixing part of the optical module, an adjustment position of a phase difference compensation plate in a Z-axis direction, wherein
the Z-axis direction is perpendicular to a main surface of a liquid crystal panel,
the fixing part has a region to apply a fixing agent,
the fixing agent is different from the fixing part, and
the region to apply the fixing agent includes a recessed space.

* * * * *